Patented Nov. 15, 1927.

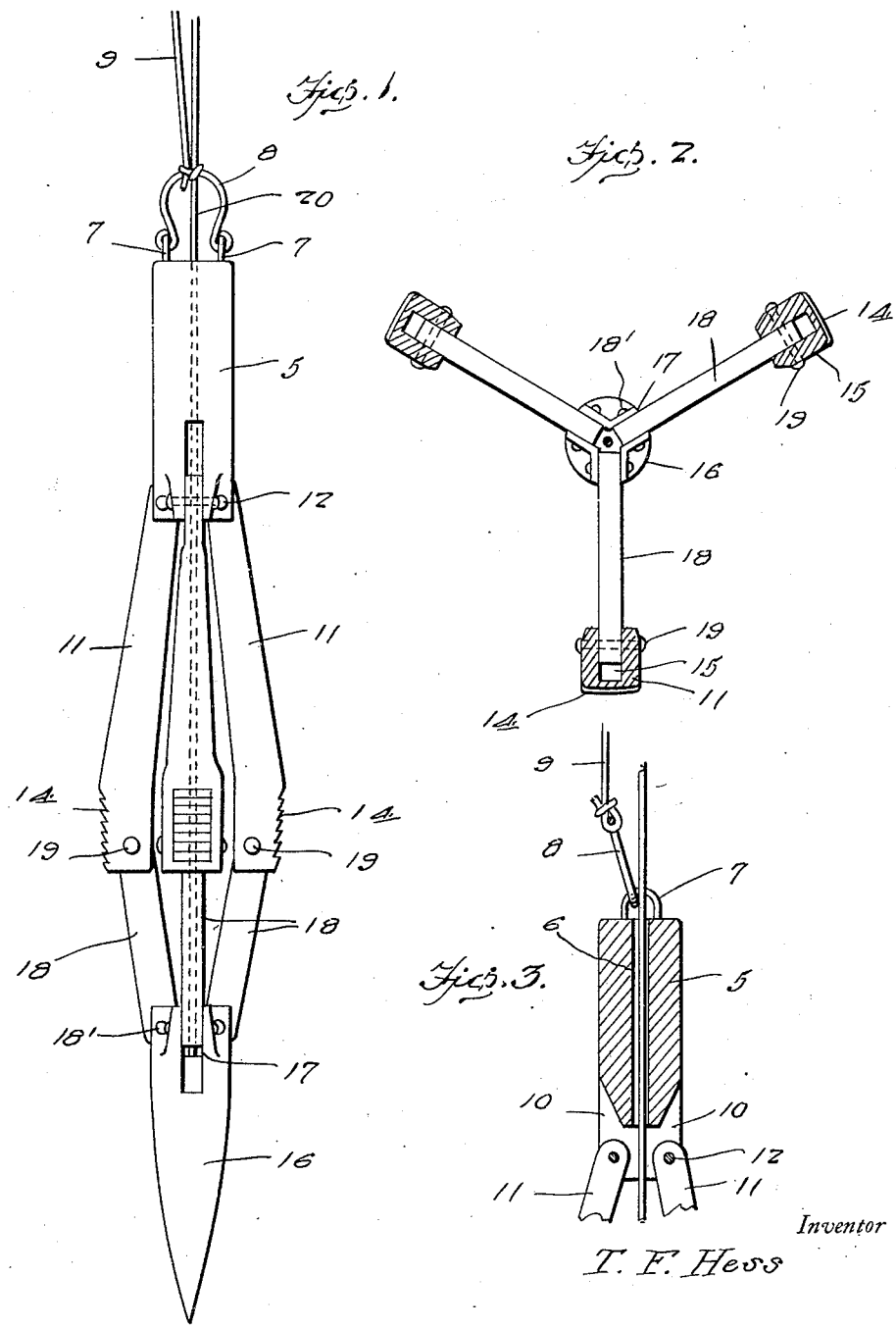

1,649,693

UNITED STATES PATENT OFFICE.

THOMAS F. HESS, OF WESTVILLE, OKLAHOMA.

WELL FISHING TOOL.

Application filed November 27, 1926. Serial No. 151,102.

The present invention relates to a well fishing tool and has for its object to provide an efficient and reliable device of this nature for fishing for well buckets, casings, and like tubular devices.

Another very important object of the invention lies in the provision of a fishing tool of this nature which will not tend to destroy the bucket or the like being fished from the well.

Another very important object of the invention lies in the provision of a fishing tool of this nature which is comparatively simple in its construction, strong and durable, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a side elevation of the fishing tool embodying the features of my invention, Figure 2 is a transverse section therethrough showing the jaws open, and Figure 3 is a vertical section through the head thereof.

Referring to the drawing in detail, it will be seen that 5 denotes a head of tubular formation to provide the bore 6 extending longitudinally thereof. Fastening elements 7 are attached to the upper end of the head 5 one to each side of the bore thereof and are engaged by the extremities of a substantially U-shaped member 8 to which is tied or otherwise secured a rope 9 or other suitable flexible member. The lower end of the head 5, is provided, in the present instance with three equally spaced slots 10. The numerals 11 denote elongated jaws, the upper ends of which are pivoted as at 12 in the slots 10. The lower or gripping ends having their outside surfaces provided with teeth 14, and their inside edges slotted as at 15. The numeral 16 denotes a bullet shape weight element, the pointed end of which extends downwardly. The upper end is provided with slots 17, in the present instance, three in number, and receive the lower ends of links 18 which are pivoted therein as at 18'. The upper ends of these links are pivoted in the slots 15 of the gripping ends of the jaws 11 by pins 19 or in any other suitable manner.

A rope 20 extends downwardly through the bore 6 and is attached to the bullet shape weight element 16.

In using this fishing tool, the same is suspended from the rope 9 so that the parts take the position shown in Figure 1, and is let down into the well until the same is inserted into the bucket or the like to be fished from the well. When the device is thus positioned, the rope 9 is released and the rope 20 is pulled upwardly, thereby causing the gripping ends of the jaws 11 to spread outwardly and to be forced outwardly into engagement with the inside of the bucket by the links 18 as the rope 20 is pulled upwardly so that the grip attained by this device becomes tighter as the resistance to the pull becomes greater.

It is though that the construction, utility, operation, and advantages of this invention will now be clearly understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

1. A device of the class described including, in combination, a hollow head, a plurality of elongated jaws having their upper ends pivotally engaged on the lower end of the head, the lower ends of the jaws having their outer edges provided with gripping teeth and their inner edges provided with slots, a plurality of links having their upper ends pivotally engaged in the slots, a weight element pivotally engaged with the lower end of said links, and a pair of cables, one of which is attached to the head and the other of which passes through the head and is attached to the weight element.

2. A fishing tool of the class described including a tubular head having a longitudinally extending bore, and at its lower end being provided wtih slots, a plurality of elongated jaws having their upper ends pivotally engaged in the slots, an elongated bullet shape weight element having its pointed end extending downwardly and its other end provided with slots, links having their lower ends pivoted in the slots of the weight element, the lower ends of the jaws being provided on their outer edges with gripping teeth and at their inner edges with slots, the upper ends of the links being pivotally mounted in the slots of the jaws, a pair of cables, means for attaching one cable to the upper end of the head, and the other cable passing through the bore of the head and attached to the weight element at the upper end thereof.

In testimony whereof I affix my signature.

T. F. HESS.